UNITED STATES PATENT OFFICE.

BURNS D. LOCKWOOD, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

VEHICLE WHEEL.

1,420,199.  Specification of Letters Patent.  Patented June 20, 1922.

Application filed August 22, 1919. Serial No. 319,087.

*To all whom it may concern:*

Be it known that I, BURNS D. LOCKWOOD, a citizen of the United States, residing in Bellevue, in the county of Allegheny and State of Pennsylvania, have invented certain new and useful Improvements in Vehicle Wheels, of which the following is a specification.

An object of the present invention is to provide a wheel for automobiles, motor trucks and the like, which, exclusive of the tire, is entirely made of metal and will be light in weight, strong, resilient and efficient.

Another object of the invention is to provide a metallic automobile wheel on which the usual demountable rim may be mounted and retained.

A further object of the invention is to provide a metallic automobile wheel in which the brake drum is integral with the wheel.

These and other objects will be apparent from the following description.

Figure 1:
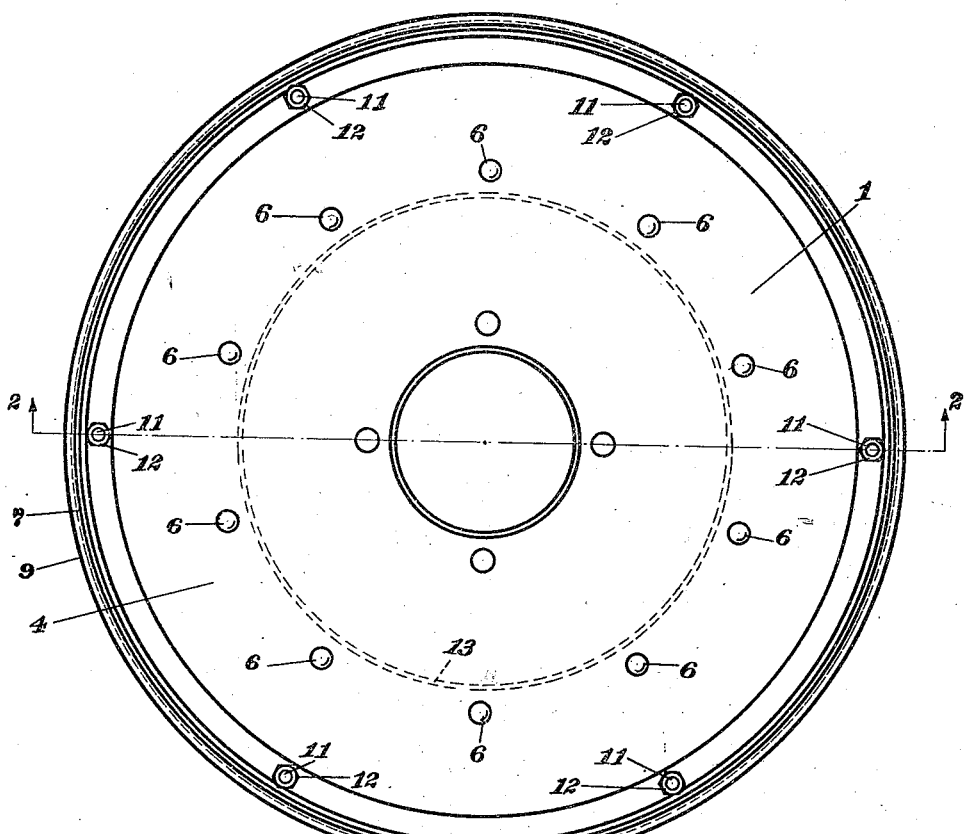
Figure 2:
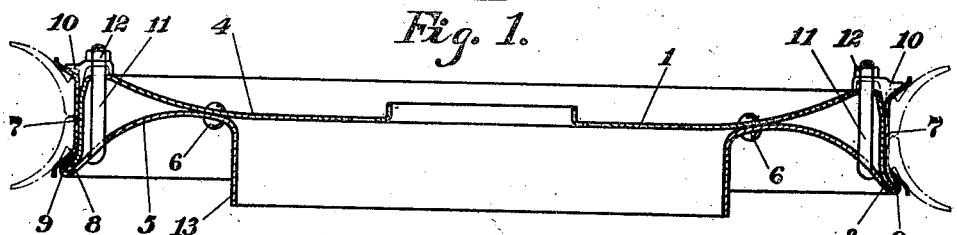

Referring now to the drawings in which like reference characters refer to like parts, Fig. 1, is a face view of the outside of a wheel constructed in accordance with the invention, the tire being omitted; and Fig. 2, is a sectional view of the same taken on the line 2—2 of Fig. 1, a portion of the tire being shown in dot and dash lines.

Referring now in detail to the drawings the reference character 1 indicates the web portion of the wheel, 2 the demountable rim and 3 the tire, the rim and tire being of any preferred form.

The web portion 1 of the wheel comprises an outer plate 4, a portion of which is pressed inwardly to dish form, and an inner plate 5 which is pressed outwardly, relatively to the outer plate 4, to dish form, and these plates where they contact with each other are connected together by rivets 6 or other suitable means. The outer portion of the plate 4 is bent to form a flat annular portion 7 on which the rim 2 is adapted to be seated and beyond this flat portion 7 the plate is bent to form an annular projecting portion 8 around which the outer portion 9 of the plate 5 is bent. When the outer edge portions of the plates 4 and 5 are connected together in the manner just described they form an annular abutment with which the rim is adapted to engage and prevent inward movement of the rim relative to the web, outward movement of the rim being prevented by the usual wedge members 10 which are drawn into place by the bolt 11 and nut 12.

The central portion of the plate 5 is provided with an integral annular flange 13 which forms a brake drum.

It will be noted that when the plates 4 and 5 are secured together in the manner just described, the periphery of the wheel is triangular in cross section thus rendering the wheel very strong at this point. The central portion of the web is of comparatively less width than the periphery of the web and is more resilient transversely of the wheel, thus a wheel is provided which is strong, light and resilient. I do not wish to be limited to the exact construction of the wheel as illustrated and described for it will be apparent to those skilled in the art to which this invention appertains that minor changes may be made in the several parts forming the wheel without departing from the spirit and scope of the appended claim.

Having thus described the invention what I claim as new and desire to secure by Letters Patent is:—

A vehicle wheel comprising a plurality of connected metal plates, said plates being dished oppositely to each other and secured in contact with each other, the outer portion of one of said plates being bent to form a seat for the tire rim and a portion of the other of said plates being bent around a portion of the first mentioned plate, said plates so formed and connected together, forming a periphery of substantially triangular cross section for said wheel.

In testimony whereof I affix my signature in the presence of two witnesses.

BURNS D. LOCKWOOD.

Witnesses:
 EDYTHE L. LAMBE,
 FRANK E. MILLER.